United States Patent
Shen et al.

(10) Patent No.: US 10,802,189 B2
(45) Date of Patent: Oct. 13, 2020

(54) WIRE GRID POLARIZER AND DISPLAY PANEL USING THE SAME

(71) Applicant: AU OPTRONICS CORPORATION, Hsin-Chu (TW)

(72) Inventors: Huang-Kai Shen, Hsin-Chu (TW); Sheng-Ming Huang, Hsin-Chu (TW); Jen-Kuei Lu, Hsin-Chu (TW); Chih-Chiang Chen, Hsin-Chu (TW); Hui-Ku Chang, Hsin-Chu (TW); Tsai-Sheng Lo, Hsin-Chu (TW); Chia-Hsin Chung, Hsin-Chu (TW); Wei-Chi Wang, Hsin-Chu (TW); Sheng-Kai Lin, Hsin-Chu (TW); Ming-Jui Wang, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 114 days.

(21) Appl. No.: 16/114,351

(22) Filed: Aug. 28, 2018

(65) Prior Publication Data
US 2019/0094435 A1 Mar. 28, 2019

(30) Foreign Application Priority Data
Sep. 22, 2017 (TW) .............................. 106132690 A

(51) Int. Cl.
G02B 5/30 (2006.01)
G02B 27/28 (2006.01)
G02F 1/1335 (2006.01)

(52) U.S. Cl.
CPC ..... *G02B 5/3058* (2013.01); *G02F 1/133528* (2013.01); *G02F 2001/133548* (2013.01)

(58) Field of Classification Search
CPC .............. G02B 5/3058; G02B 30/25; G02F 1/133528; G02F 1/133536; G02F 1/13362; G02F 2001/133548
See application file for complete search history.

(56) References Cited

U.S. PATENT DOCUMENTS

| | | | | |
|---|---|---|---|---|
| 2004/0264350 A1* | 12/2004 | Ueki | .................... | G02B 5/3058 369/112.16 |
| 2008/0094547 A1* | 4/2008 | Sugita | .................. | G02B 5/3058 349/96 |

(Continued)

FOREIGN PATENT DOCUMENTS

| CN | 102549482 A | 7/2012 |
|---|---|---|
| CN | 104865630 A | 8/2015 |

(Continued)

OTHER PUBLICATIONS

National Intellectual Property Administration of the People's Republic of China (PRC), Office Action dated Mar. 2, 2020.

*Primary Examiner* — Mustak Choudhury
(74) *Attorney, Agent, or Firm* — WPAT, PC

(57) ABSTRACT

A wire grid polarizer and a display panel using the same are provided. The wire grid polarizer includes a substrate, a plurality of wire grids, a plurality of patterned light absorbing layers, and a surface covering layer. The plurality of wire grids are disposed on the substrate, wherein there are a plurality of gaps between every two wire grids. The plurality of patterned light absorbing layers are disposed corresponding to and overlapping the wire grids respectively, wherein every two of the patterned light absorbing layers have one of the gaps. The surface covering layer is disposed on the patterned light absorbing layers and directly contacts the patterned light absorbing layers.

13 Claims, 14 Drawing Sheets

(56) References Cited

U.S. PATENT DOCUMENTS

| | | | |
|---|---|---|---|
| 2008/0152892 A1* | 6/2008 | Edlinger | B01D 21/0012 |
| | | | 428/310.5 |
| 2009/0066885 A1* | 3/2009 | Kumai | G02B 5/3058 |
| | | | 349/96 |
| 2011/0096396 A1* | 4/2011 | Kaida | C23C 14/024 |
| | | | 359/492.01 |
| 2012/0086887 A1 | 4/2012 | Lee et al. | |
| 2015/0062500 A1 | 3/2015 | Park et al. | |
| 2016/0131810 A1 | 5/2016 | Takada et al. | |
| 2017/0293059 A1* | 10/2017 | Nielson | C23C 16/44 |

FOREIGN PATENT DOCUMENTS

| | | |
|---|---|---|
| CN | 105378520 A | 3/2016 |
| JP | 2010072591 A | 4/2010 |
| JP | 2010145854 A | 7/2010 |
| TW | 200500688 A | 1/2005 |
| TW | 201219860 A | 5/2012 |
| WO | WO2012053754 A2 | 4/2012 |

\* cited by examiner

WIRE GRID POLARIZER AND DISPLAY PANEL USING THE SAME

BACKGROUND OF THE DISCLOSURE

1. Field of the Disclosure

The present disclosure generally relates to a wire grid polarizer and a display panel using the same.

2. Description of the Related Art

A polarizer is an optical film that allows beams having a specific polarization to pass through it, which converts natural light into a beam with liner polarization. Specifically, the polarizer allows the horizontal components of unpolarized light be transmitted, while the vertical components of the unpolarized light are absorbed or reflected.

Polarizers are widely used in various devices. For example, liquid crystal displays use the polarized beam converted by two polarizing film to achieve the effect of displaying. The light provided by a back-light module transmits through the first polarizing film and is then converted into a beam with liner polarization. With the twisting of the liquid crystal molecule line-up, a brightness variation is produced when the beam arrives at the second polarizing film. Afterwards, it arrives at the user's eyes to achieve the effect of displaying.

SUMMARY OF THE DISCLOSURE

The present disclosure is to provide a wire grid polarizer, wherein the wire grids are not easily damaged or polluted and the extent of the lowering of extinction ratio is reduced.

The present disclosure is to provide a display panel, wherein the wire grids in the display panel are not easily damaged or polluted and the extent of the lowering of extinction ratio is reduced.

The wire grid polarizer includes a substrate, a plurality of wire grids, a plurality of patterned light absorbing layers, and a surface covering layer. The plurality of wire grids are disposed on the substrate, wherein there are a plurality of gaps between every two wire grids. The plurality of patterned light absorbing layers are disposed corresponding to and overlapping the wire grids respectively. Every two of the patterned light absorbing layers have one of the gaps. The patterned light absorbing layers are closer to an external light incidence direction than the wire grids. The surface covering layer is disposed on the patterned light absorbing layers and directly contacts the patterned light absorbing layers.

The display panel includes the wire grid polarizer described above, another substrate, a display medium, and a pixel layer. The other substrate is disposed on the substrate of the wire grid polarizer. The display medium is disposed between the substrate and the other substrate. The pixel layer is disposed on one of the substrate and the other substrate. The pixel layer includes a plurality of sub-pixels, wherein each of the sub-pixels includes at least one pixel electrode electronically coupled to a corresponding switching unit.

DETAILED DESCRIPTION OF THE PREFERRED EMBODIMENT

Figure 1:
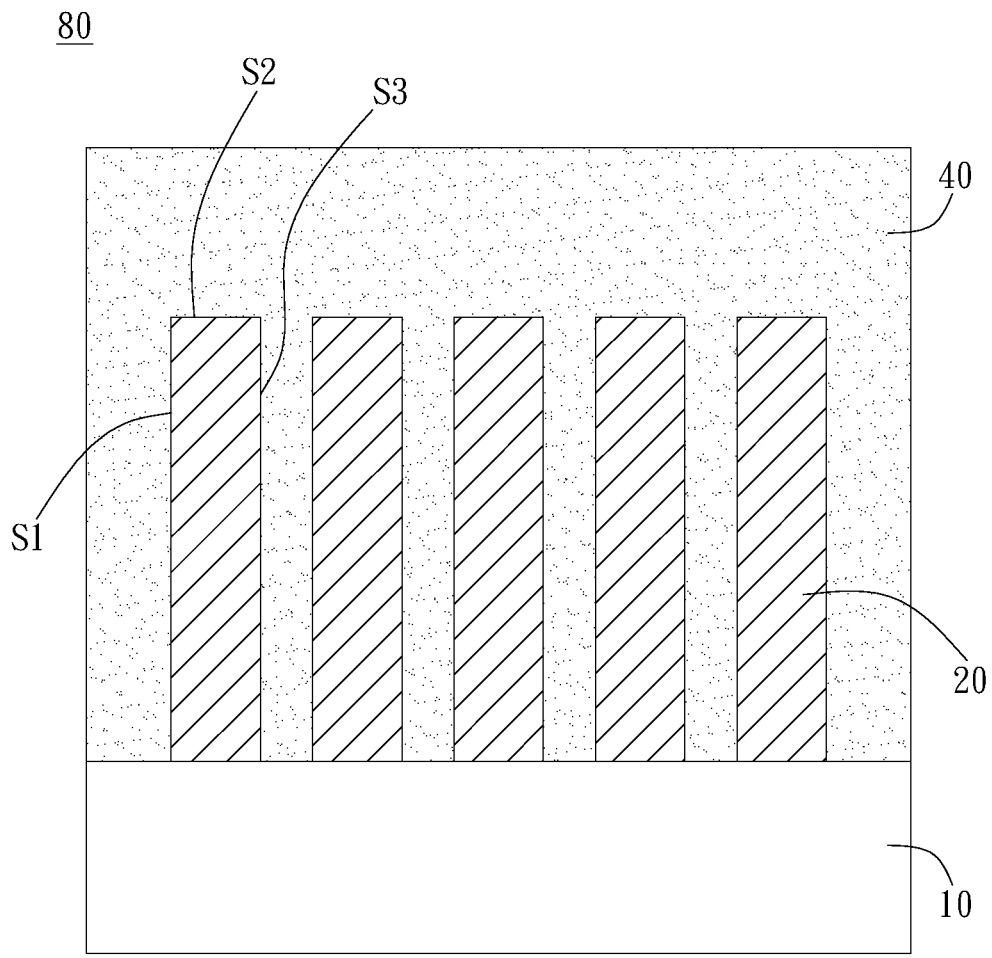
FIG. 1 illustrates a comparison embodiment I of the wire grid polarizer of the present disclosure.

In the drawings, the thickness of layers, films, panels, regions, etc., are exaggerated for clarity. The same reference numerals denote the same elements throughout the specification. It will be understood that when an element such as a layer, film, region, or substrate is referred to as being "on" or "connected to" another element, it can be directly on or in connection with another element, or Intermediate elements can also exist. In contrast, when an element is referred to as being "directly on another element" or "directly connected to" another element, there are no intervening elements present. As used herein, "connected" may refer to a physical and/or electrical connection. Furthermore, "electrically connected" or "coupled" may be other elements between two elements.

As used herein, "about," "approximately," or "substantially" includes the average of the stated values and acceptable deviations of the particular value determined by one of ordinary skill in the art, taking into account the discussed measurement and the specific amount of measurement-related error (ie, the limits of the measuring system). For example, "about" can mean within one or more standard deviations of the stated value, or within ±30%, ±20%, ±10%, ±5%. Furthermore, as used herein, "about", "approximately" or "substantially" may select an acceptable range of deviation or standard deviation depending on optical properties, etching properties, or other properties, without applying one standard deviation for all properties.

Unless otherwise defined, all terms (including technical and scientific terms) used herein have the same meaning as commonly understood by one of ordinary skill in the art to which this disclosure belongs. It will be further understood that terms such as those defined in commonly used dictionaries should be interpreted as having a meaning that is consistent with their meaning in the context of the related art and the present disclosure and will not be interpreted as idealized or excessive. The formal meaning, unless explicitly defined in this article.

Furthermore, relative terms such as "lower" or "bottom" and "upper" or "top" may be used herein to describe the relationship of one element to another element. It should be understood that relative terms are intended to encompass different orientations of the device in addition to the orientation shown in the drawings. For example, if the device in one of the drawings is turned over, the elements that are described as on the "lower" side of other elements will be directed to on the "upper" side of the other elements. Thus, the exemplary term "lower" can be used to refer to the "lower" and "upper" orientations, depending on the particular orientation of the drawings. Similarly, if the device in one of the drawings is turned over, the elements that are described as "below" or at the "bottom" of other elements will be directed to "on" the other elements. Thus, the exemplary term "lower" or "bottom" can encompass both the upper and the lower orientations.

As shown in the embodiment in FIG. 1, which illustrates a comparison embodiment I of the wire grid polarizer of the present disclosure, the wire grid polarizer 80 includes a substrate 10, a plurality of wire grids 20, and a protecting layer 40. The plurality of wire grids 20 are disposed on the substrate 10. The surface covering layer 40 covers the wire grids 20, wherein the surface covering layer 40 covers the side surfaces S1 and S3 of the wire grids 20 and the top surface S2 connecting the two side faces. However, because the surfaces S1, S2, S3 of the wire grids 20 directly contacts the protecting layer 40, the wire grids 20 may be easily damaged or polluted. Moreover, the extinction ratio of the wire grid polarizer 80 may be lowered and hence the display quality drops.

Figure 2:
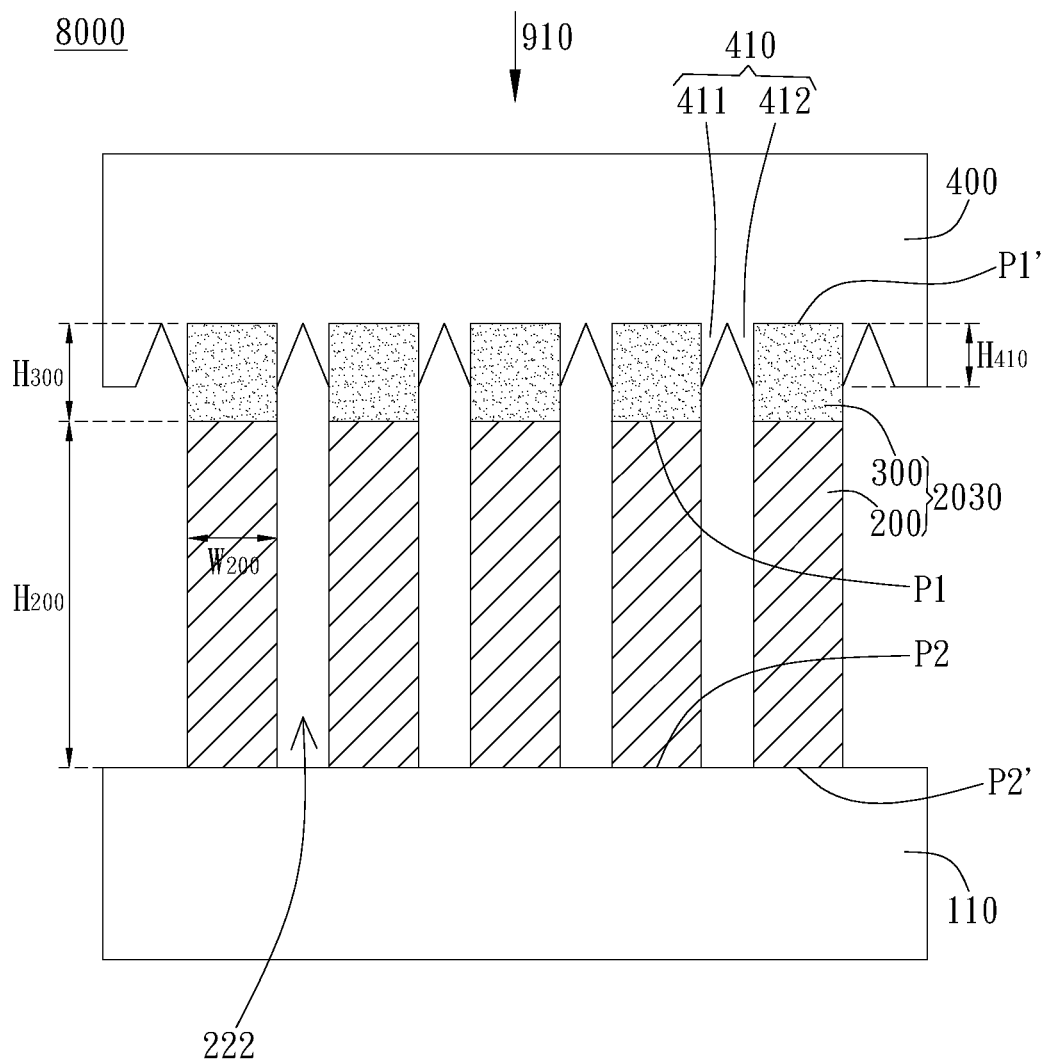
FIG. 2 illustrates the preferable embodiment of the wire grid polarizer of the present disclosure.

As shown in the embodiment in FIG. 2, the wire grid polarizer 8000 of the present disclosure includes a substrate 110, a plurality of wire grids 200, a plurality of patterned light absorbing layers 300, and a surface covering layer 400. The plurality of wire grids 200 are disposed on the substrate 110, wherein there are a plurality of gaps 222 between every two wire grids 200. For example, the gaps 222 are between the two adjacent wire grids 200. The plurality of patterned light absorbing layers 300 are disposed corresponding to and overlapping the wire grids 200 respectively. There are also a plurality of gaps 222 between every two patterned light absorbing layers 300. For example, the gaps 222 are between the two adjacent patterned light absorbing layers 300. In one embodiment, the patterned light absorbing layers 300 are preferably closer to an external light incidence direction 910 than the wire grids 200. However, the external light incidence direction 910 is not used to limit the present disclosure. The surface covering layer is disposed on the patterned light absorbing layers and directly contacts the patterned light absorbing layers.

In one embodiment, for example, the substrate 110 is glass, the wire grids 200 are aluminum, the patterned light absorbing layers 300 are $SiO_2$, and the surface covering layer 400 is Indium tin oxide (ITO). In different embodiments, however, one skilled in the art could select the materials of the substrate 110, the wire grids 200, and the patterned light absorbing layers 300 in accordance with actual requirement. The substrate 110 could be glass, quartz, polymers (e.g. acrylics, triacetyl cellulose (TAC), cyclo olefin polymer (COP), Polycarbonate (PC), or Polyethylene Terephthalate (PET)), etc. The wire grids 200 is selected from metals or alloys, such as chromium, silver, copper, nickel, cobalt, aluminum, or gold. The patterned light absorbing layers 300 could be NiO, FeSi, MoOx, MoTaOx, $MgO_2$, $CeO_2$, $ZrO_2$, or ZnO. The material of the surface covering layer 400 which is approximately flat and surface covering could be selected from transparent conducting materials, silicon oxide, nitric oxide, or silicon oxynitride, wherein the transparent material could be ITO or indium zinc oxide (IZO). At least one of the described layers (such as 200, 300, 400) could be single layer or multiple layers.

In this embodiment, every wire grid 200 includes a first end P1 away from the substrate 110 and a second end P2 close to the substrate 110. Each wire grid 200 has a corresponding patterned light absorbing layers 300 disposed on it and hence to form a plurality of patterned structures 2030, wherein the patterned light absorbing layers 300 completely overlap the perpendicular projection of the corresponding wire grids 200 on the substrate 110. The plurality of patterned structures 2030 are disposed on the substrate 110, wherein every two of the structures 2030 have a gap 222. For example, the gaps 222 are between the two adjacent structures 2030. Each of the plurality of patterned structures 2030 includes a first end P1' away from the substrate 110 and a second end P2' close to the substrate 110. The surface covering layer 400 covers the first ends P1' of the plurality of the patterned structures 2030 (such as one end of the patterned light absorbing layer 300 away from the wire grid 200) and makes the top ends of the patterned structures 2030 coupled with each other via the surface covering layer 400. For example, the plurality of patterned light absorbing layer 300 do not directly contact each other.

Accordingly, the wire grid polarizer 8000 of the present disclosure can use the surface covering layer 400 as a protection layer to avoid damaging or polluting the wire grids 200 in the subsequent process and as a flat layer in a subsequent laminating process (such as TFT processing). Meanwhile, the patterned light absorbing layers 300 can reduce the extent of the lowering of extinction ratio.

With respect to the comparison embodiment I shown in FIG. 1, since the surface covering layer 400 does not contact the wire grid 200 and there are gaps 222 forming optical resonant cavities between the adjacent two wire grids, the light has better extinction ratio when transmitting through the wire grid polarizer. Hence, the overall contrast of the display image is effectively increased. The extinction ratio is simulated by a finite-difference time-domain (FDTD) software, wherein an equation with respect to the extinction ratio (unit free) is:

extinction ratio=$Tp/Ts$;

Tp: the maximum transmittance (%) of P wave (or be described as primary wave), unit free;
Ts: the minimum transmittance (%) of S wave (or be described as secondary wave), unit free.

As shown in an embodiment in FIG. 2, the height $H_{200}$ of the wire grid 200 is larger than the height $H_{300}$ of the patterned light absorbing layer 300. In different embodiments, however, the height $H_{200}$ of the wire grid 200 is about equal or smaller than the height $H_{300}$ of the patterned light absorbing layer 300. In one embodiment, the width $W_{200}$ of the wire grid 200 is between 10 nm and 200 nm approximately, wherein the width of the gap 222 is between 10 nm and 200 nm approximately, wherein the height $H_{200}$ of the wire grid 200 is between 100 nm and 400 nm approximately.

As shown in an embodiment in FIG. 2, the material of the surface covering layer 400 is preferably selected from transparent conducting materials, wherein the transparent material could be ITO or IZO. The surface of the surface covering layer 400 (such as the lower surface) includes a plurality of protrusions 410 extending toward the wire grids 200. At least one of the plurality of the protrusions 410 directly contacts the side wall of one of the patterned light absorbing layers 300. For example, the plurality of the protrusions 410 directly contacts the side wall of one of the corresponding patterned light absorbing layers 300 respectively. However, the plurality of the protrusions 410 do not fill the gaps 222 to the full. As shown in the embodiment in FIG. 2, the portion of the surface covering layer 400 extending into the gaps 222 forms the protrusions 410, wherein the protrusions 410 directly contact the side walls of the patterned light absorbing layers 300 by attaching to the side walls of the patterned light absorbing layers 300. The protrusions 410 could be cusp-shaped, semicircle-shaped, square-shaped, or in other suitable shape. As shown in the embodiment in FIG. 2, the portion of the surface covering layer 400 extending into the gaps 222 does not exceed the interface between the patterned light absorbing layer 300 and the wire grid 200 (an example of the interface: the location where the patterned light absorbing layer 300 directly contacts the wire grid 200). Thus, it keeps the surface covering layer 400 from directly contacting the wire grids 200 to reduce the extent of the lowering of extinction ratio.

As shown in the embodiment in FIG. 2, the protrusion 410 includes a first wall body 411 and a second wall body 412 connecting with the side walls of adjacent two patterned absorbing layers 300. The height $H_{410}$ of the protrusions 410 are less than the heights $H_{300}$ of the patterned light absorbing layers 300.

Figure 3A:
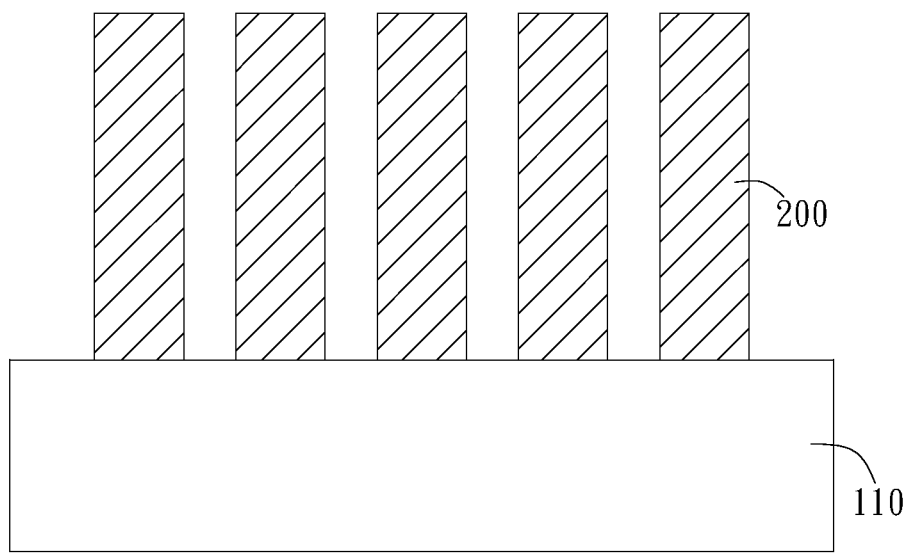
FIGS. 3A, 3B, and 3C illustrate comparison embodiments II, III, and IV of the wire grid polarizer of the present disclosure.
Figure 3B:
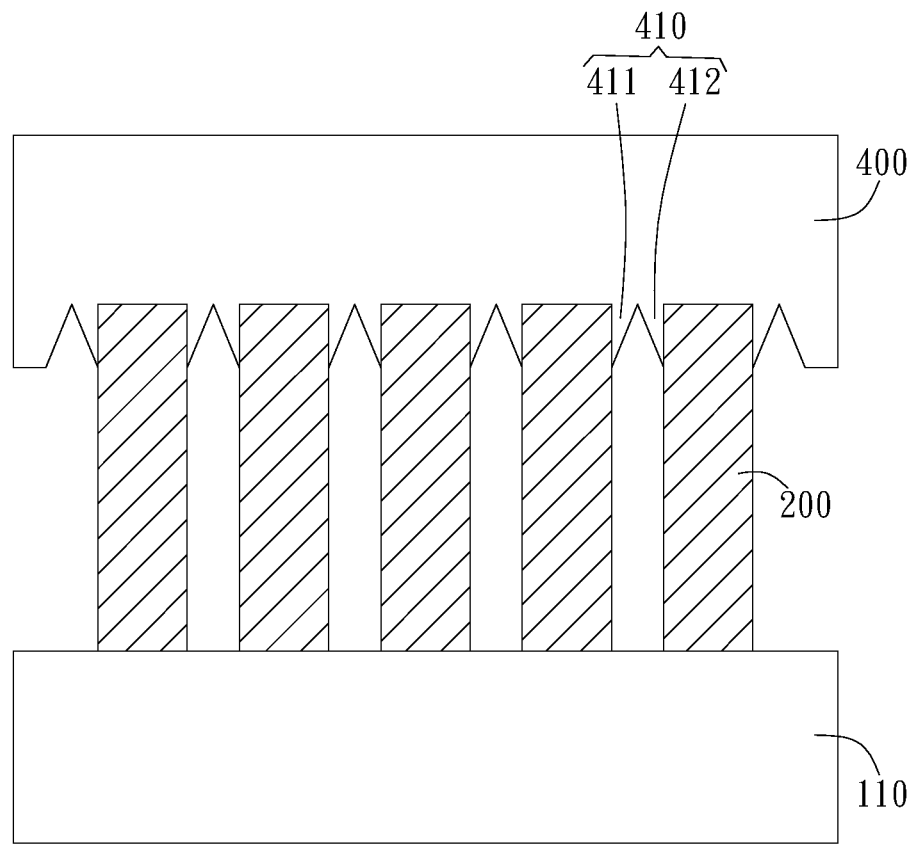
Figure 3C:
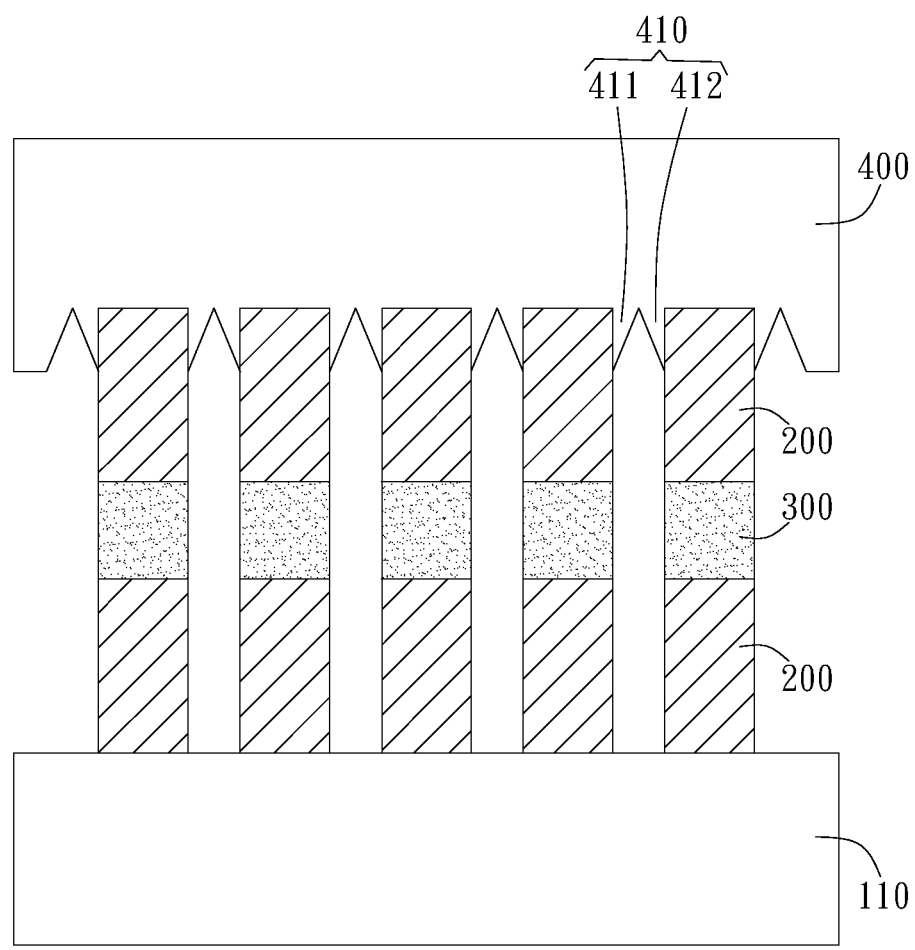

On the other hand, please refer to FIGS. 3A, 3B, and 3C which illustrate comparison embodiments II, III, and IV of the wire grid polarizer of the present disclosure. In view of FIGS. 3A and 3B, except for the wire grids 200 shown in FIG. 3A, the embodiment in FIG. 3B further includes a surface covering layer 400. Though the surface covering layer 400 could be a protecting layer or a flat layer, the extinction ratio of the embodiment in FIG. 3B decreases significantly due to the contacting of the surface covering layer 400 and the wire grids 200. In view of FIGS. 3B and 3C, except for the wire grids 200 and the surface covering layer 400 shown in FIG. 3B, the embodiment in FIG. 3C further includes the patterned absorbing layers 300. For example, one wire grid is divided into two parts, wherein the patterned absorbing layer 300 is sandwiched between the two portions of the wire grid 200. The introducing of the patterned absorbing layer 300 increases the pillar height to increase the extinction ratio. Therefore, the extinction ratio of the embodiment in FIG. 3C is higher than that of the embodiment in FIG. 3B. In view of FIGS. 3A and 3C, except for the wire grids 200 shown in FIG. 3A, the embodiment in FIG. 3C further includes the surface covering layer 400 and the patterned absorbing layers 300 sandwiched between two portions of each wire grid 200. Though the patterned absorbing layer 300 increases the pillar height, the extinction ratio of the embodiment in FIG. 3C is still lower than that of the embodiment in FIG. 3A due to the contact of the surface covering layer 400 with the wire grids 200.

TABLE 1

| | embodiment (FIG. 2) | comparison embodiment II (FIG. 3A) | comparison embodiment III (FIG. 3B) | comparison embodiment IV (FIG. 3C) |
|---|---|---|---|---|
| extinction ratio | $7.97 \times 10^{11}$ | $3.67 \times 10^{11}$ | $1.31 \times 10^{10}$ | $9.72 \times 10^{10}$ |

In view of FIGS. 3A and 2, except for the wire grids 200 shown in FIG. 3A, the embodiment in FIG. 2 further includes the surface covering layer 400 and the patterned absorbing layers 300. The patterned absorbing layer 300 not only increases the extinction ratio by increasing the pillar height, but also keeps the surface covering layer 400 from directly contacting the wire grids 200. Thus, the extinction ratio of the embodiment in FIG. 2 is higher than that of the embodiment in FIG. 3A. In view of FIGS. 3B and 2, except for the wire grids 200 and the surface covering layer 400 shown in FIG. 3B, the embodiment in FIG. 2 further includes the patterned absorbing layers 300. The patterned absorbing layer 300 not only increases the extinction ratio by increasing the pillar height, but also keeps the surface covering layer 400 from directly contacting the wire grids 200. Thus, the extinction ratio of the embodiment in FIG. 2 is significantly higher than that of the embodiment in FIG. 3B. In view of FIGS. 3C and 2, the difference between the two is the location of the patterned absorbing layer 300. Though the pillar height of these two embodiments are about the same, since the extinction ratio of wire grid 200 is better than the patterned absorbing layer 300, the contact of the surface covering layer 400 with the wire grids 200 causes more loss of the extinction ratio to the embodiment in FIG. 3C than to the embodiment in FIG. 2.

Figure 8:
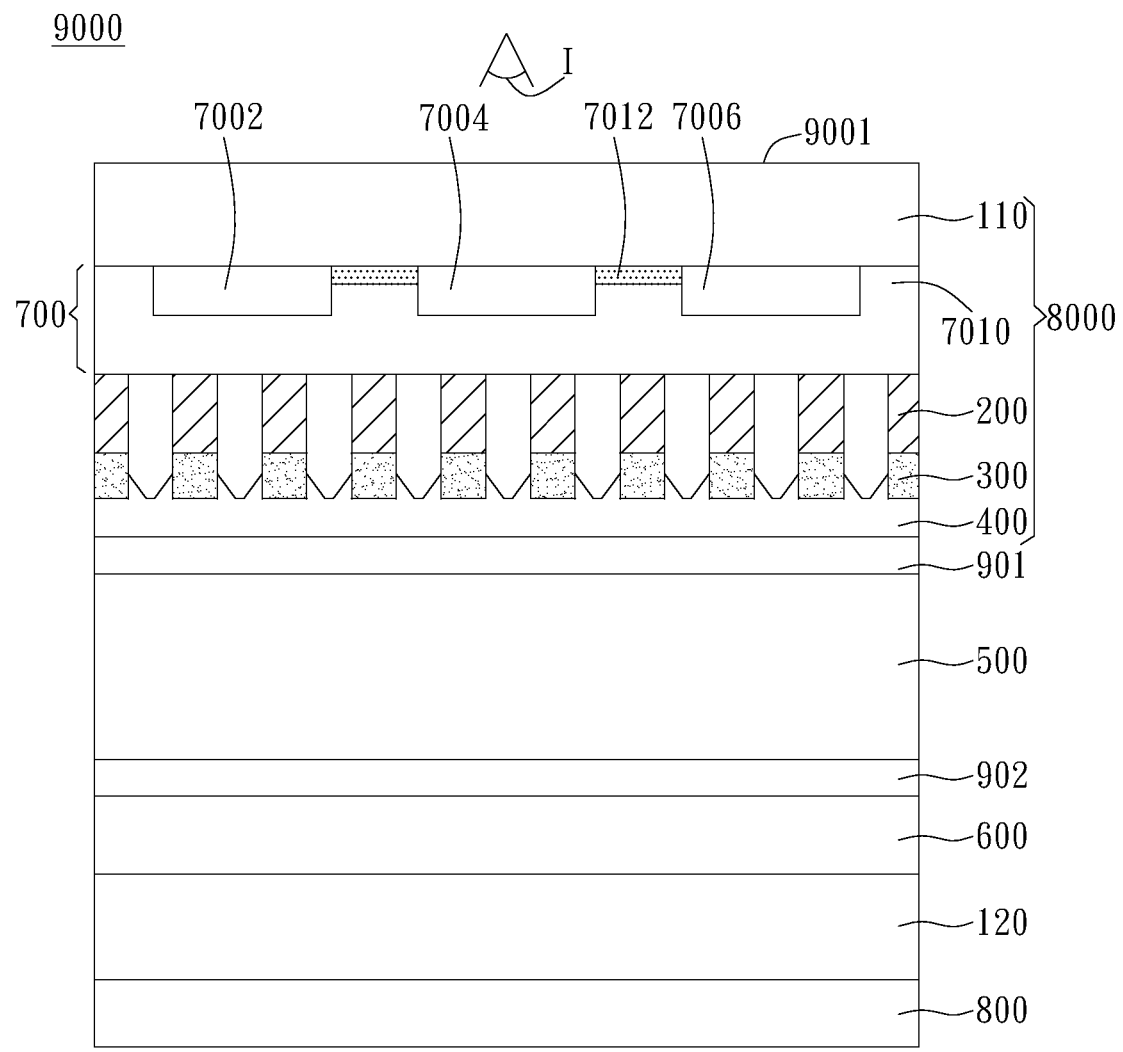
FIGS. 8, 9, and 10 illustrate embodiments of the wire grid polarizer of the present disclosure disposed on an upper substrate of a display panel.
Figure 9:
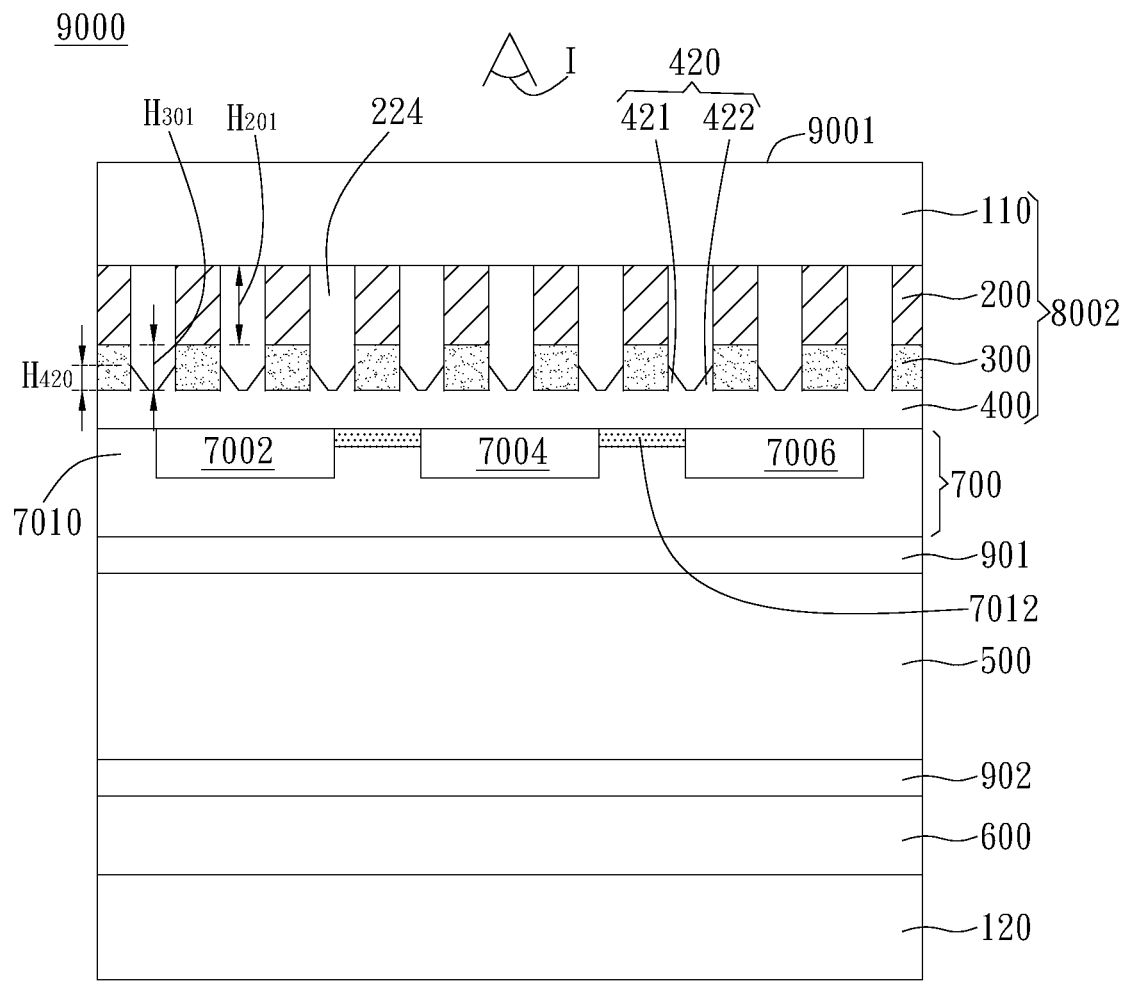
Figure 10:
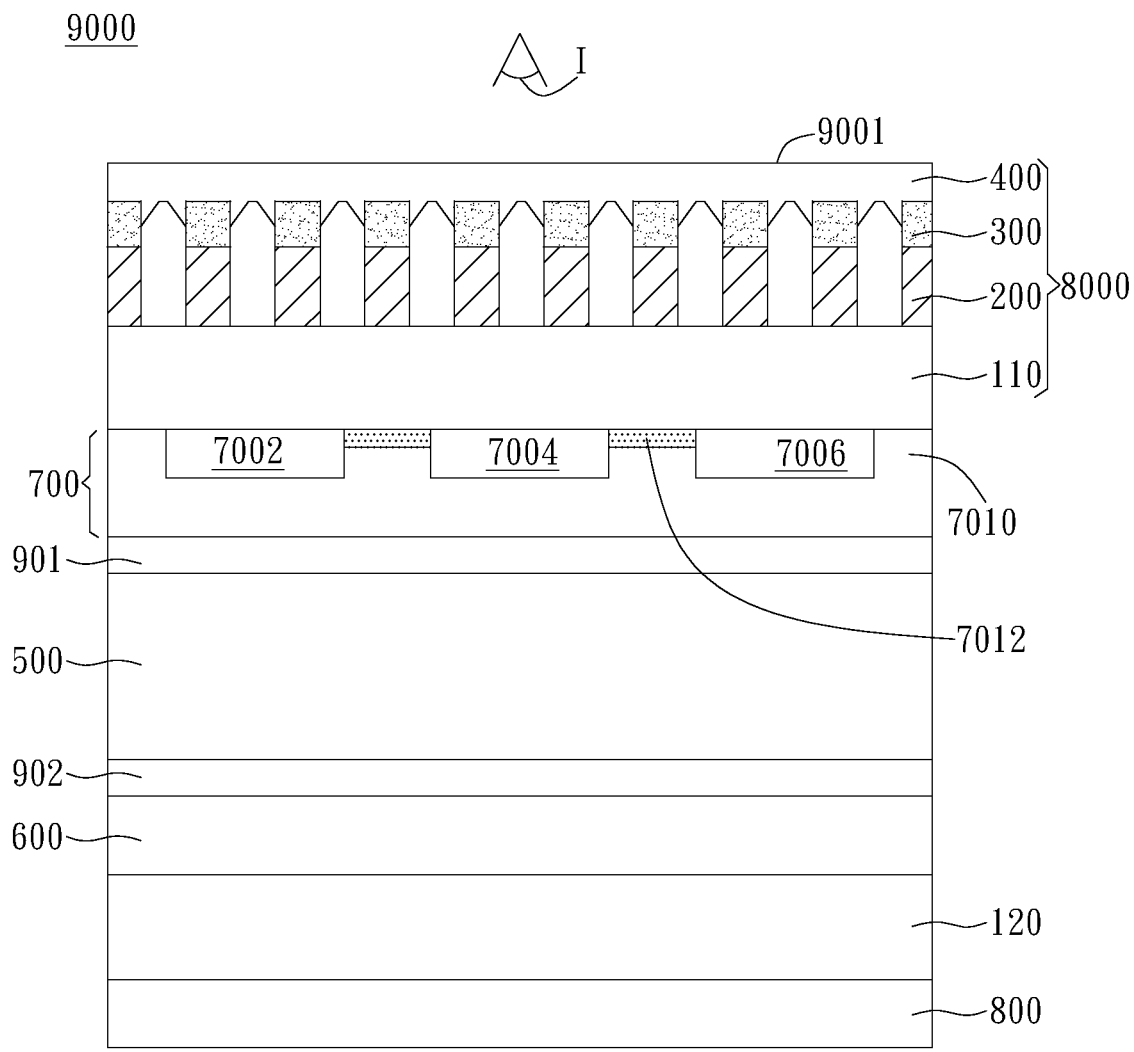

FIGS. 4, 5, 6, and 7 illustrate embodiments of the wire grid polarizer of the present disclosure disposed on a lower substrate of a display panel. FIGS. 8, 9, and 10 illustrate embodiments of the wire grid polarizer of the present disclosure disposed on an upper substrate of a display panel. The location of the human eyes I with respect to the display panel 9000 is illustrated in the figures. The display panel 9000 includes the above described wire grid polarizer 8000, another substrate 120, a display medium 500, and a pixel layer 600. The display medium 500 is disposed between the substrate 110 and the other substrate 120. The display medium 500 includes, but is not limited to, a liquid crystal layer.

In the display panel 9000 in FIGS. 4, 5, 6, and 7, the wire grid polarizer 8000 is disposed on the lower substrate of the display panel, wherein the illustrated lower substrate is the substrate 110. In the display panel 9000 in FIGS. 8, 9, and 10, the wire grid polarizer 8000 is disposed on the upper substrate of the display panel, wherein the illustrated upper substrate is the substrate 110. The other substrate 120 could be glass, quartz, polymers (e.g. acrylics, triacetyl cellulose (TAC), cyclo olefin polymer (COP), Polycarbonate (PC), or Polyethylene Terephthalate (PET)), or other suitable material and could be substantially the same as or different than the substrate 110. A polarizing film 800 is disposed on the outer surface of the other substrate 120. In conjunction with the wire grid polarizer 8000 disposed on the substrate 110, the overall thickness of the display panel 9000 is reduced and the light transmittance of the display panel 9000 is increased.

The pixel layer 600 includes a plurality of sub-pixels, wherein each of the sub-pixels includes at least one pixel electrode electronically coupled to a corresponding switching unit. More particularly, the pixel layer 600 includes a thin-film transistor (TFT) layer. In other embodiments, however, pixel electrodes and TFT layers could be disposed between other layers. The alignment layers 901 and 902 are disposed optionally. A wave length converting layer 700 is disposed on one of the substrate 110 and the other substrate 120. The wave length converting layer 700 further includes a first converting part 7002, a second converting part 7004, and a third converting part 7006 for displaying different color rays. For example, the first converting part 7002 could display red rays, the second converting part 7004 could display green rays, and the third converting part 7006 could display blue rays; however, the present disclosure is not limited to such color arrangement. Light shading layers 7012 are disposed between the converting parts 7002, 7004, and 7006 to avoid color mixing between different color rays. The converting parts 7002, 7004, and 7006 are color filter layers and/or quantum dot layers, for example. The wave length converting layer 700 further includes optionally a transparent flat layer 7010.

Figure 4:
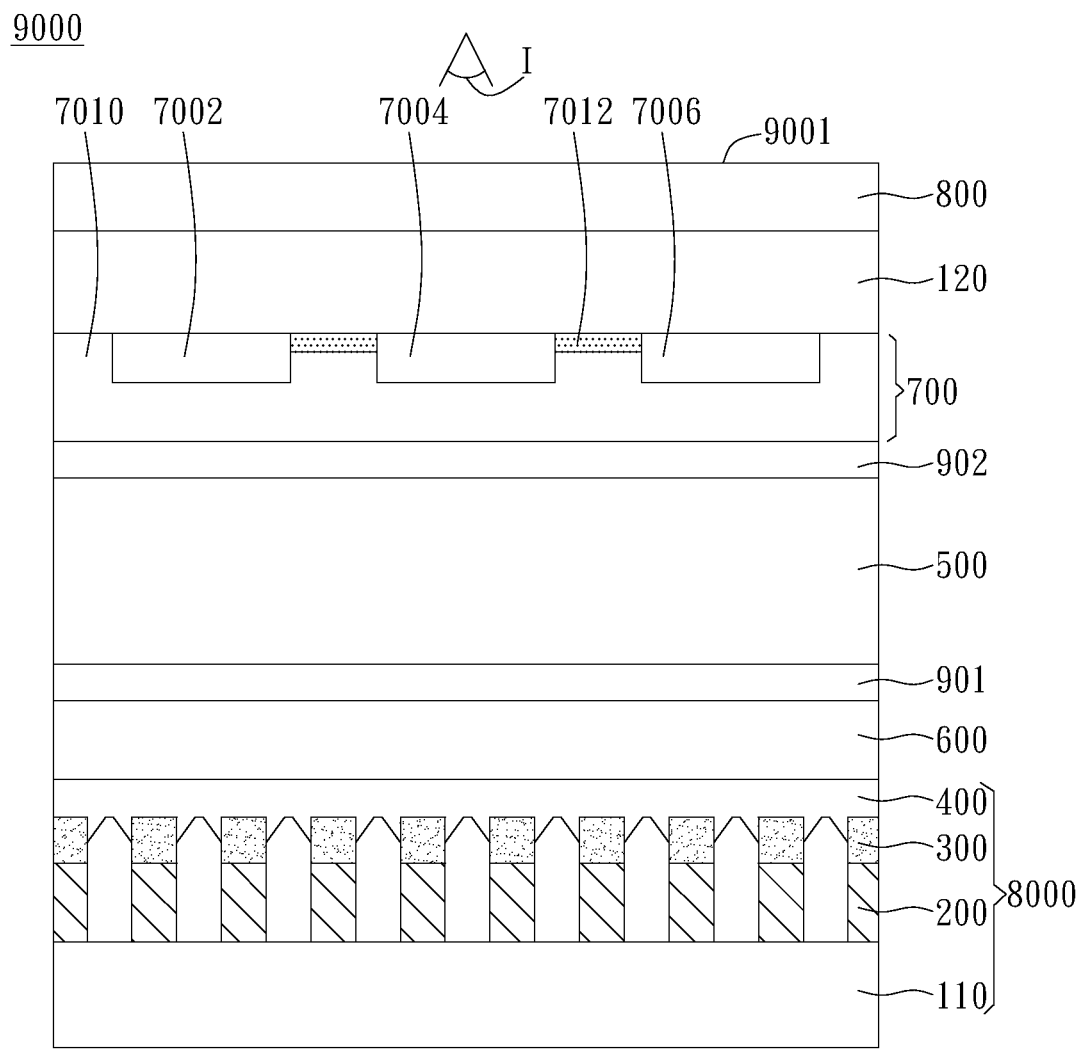
FIGS. 4, 5, 6, and 7 illustrate embodiments of the wire grid polarizer of the present disclosure disposed on a lower substrate of a display panel.
Figure 5:
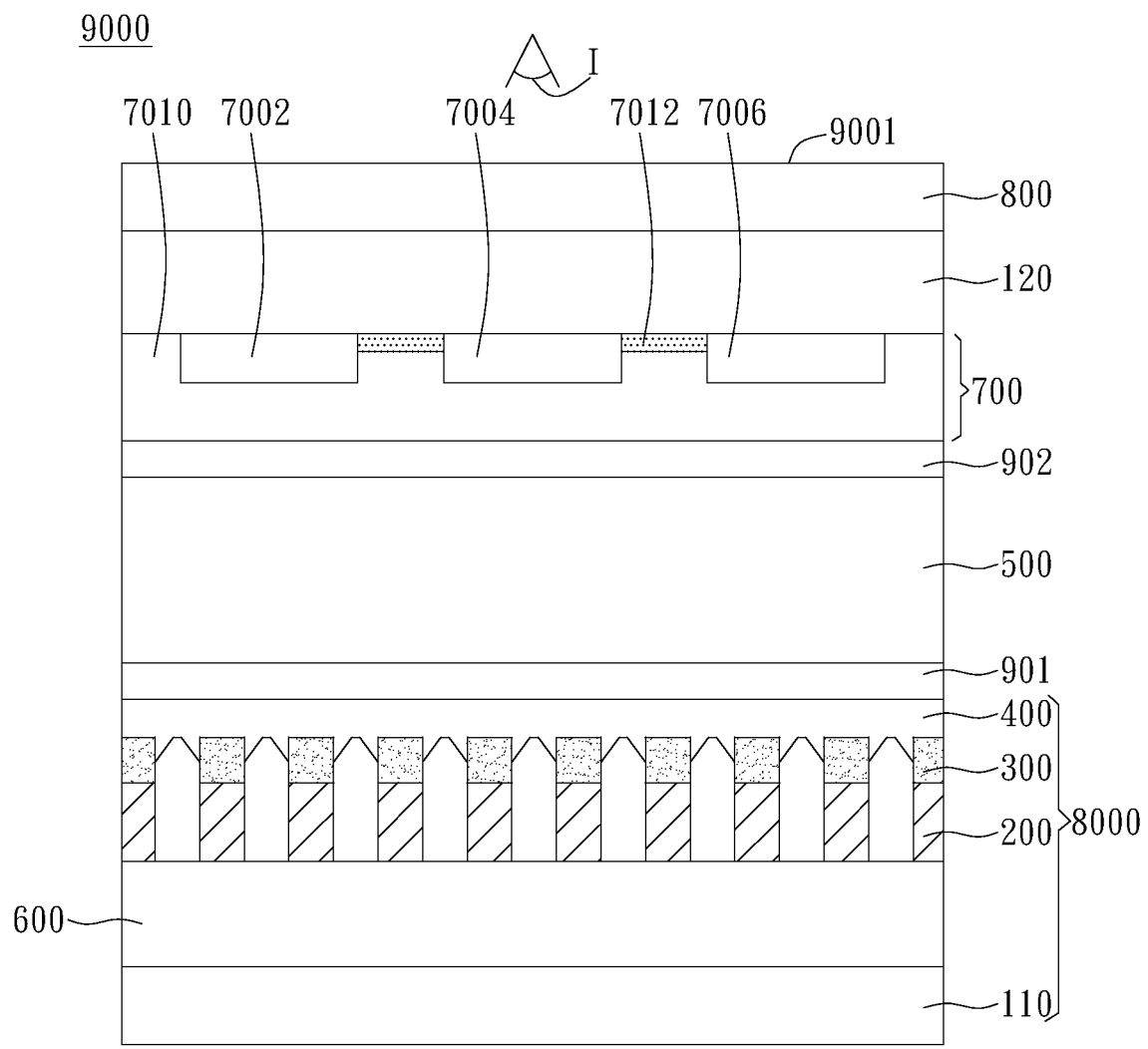

Specifically, as shown in the embodiments in FIGS. 4 to 7, the pixel layer 600 is disposed on the inner surface of the substrate 110. The main difference between the embodiments in FIGS. 4 and 5 is the relative positions of wire grids 200, the pixel layer 600, and the display medium 500, and one can refer to the above description for other parts of the embodiments. In the example embodiment shown in FIG. 4, the pixel layer 600 is disposed between the wire grids 200 and the display medium 500. In the example embodiment shown in FIG. 5, the wire grids 200 is disposed between the pixel layer 600 and the display medium 500. Since the wire grids 200 of the example embodiment in FIG. 5 is on the pixel layer 600, the material of the surface covering layer 400 is preferably transparent conductive material for use as pixel electrodes or common electrodes.

Figure 6:
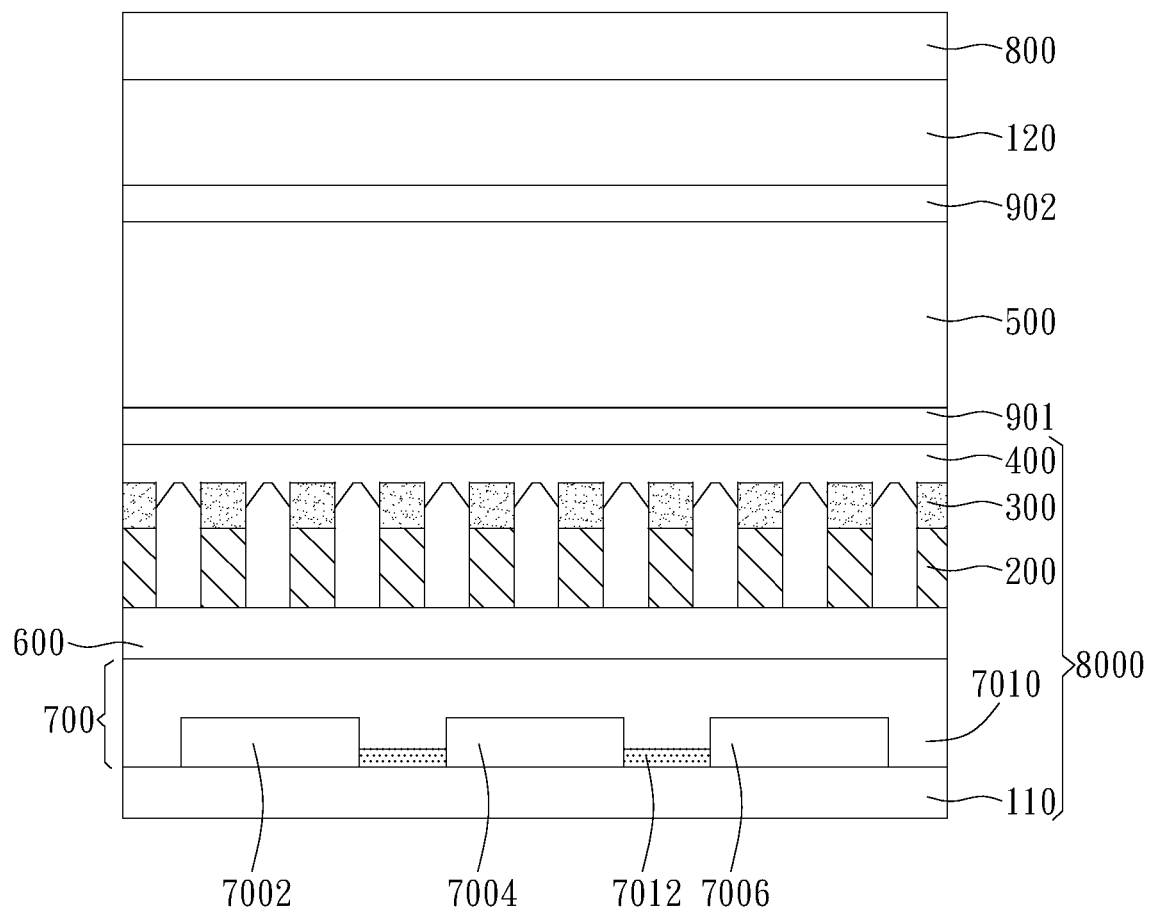

In the example embodiment shown in FIG. 6, it differs from those in FIGS. 4 and 5 by that the wave length converting layer is disposed on the lower substrate (such as the substrate 110). The wave length converting layer 700 is optionally disposed between the pixel layer 600 and the substrate 110, or the pixel layer 600 is disposed between the wave length converting layer 700 and the substrate 110, and one can refer to the above description for other parts of the embodiments. When the wave length converting layer 700 includes a quantum dot layer, the wire grid polarizer is preferably disposed between the wave length converting layer 700 and the display medium 500, so as to effectively improve the depolarization of the wave length converting layer 700. It includes the positions of the wire grids 200 and the surface covering layer 400 with respect to the display medium 500. As shown in the embodiment in FIG. 6, the surface covering layer 400 is disposed between the wire girds 200 and the display medium 500. Besides, since the wire grids 200 of the embodiment in FIG. 6 is on the pixel layer 600, the material of the surface covering layer 400 is preferably transparent conductive material for use as pixel electrodes or common electrodes. The TFT included in the pixel layer 600 is preferably disposed between the wave length converting layer 700 and the lower substrate (such as the substrate 110).

Figure 7:
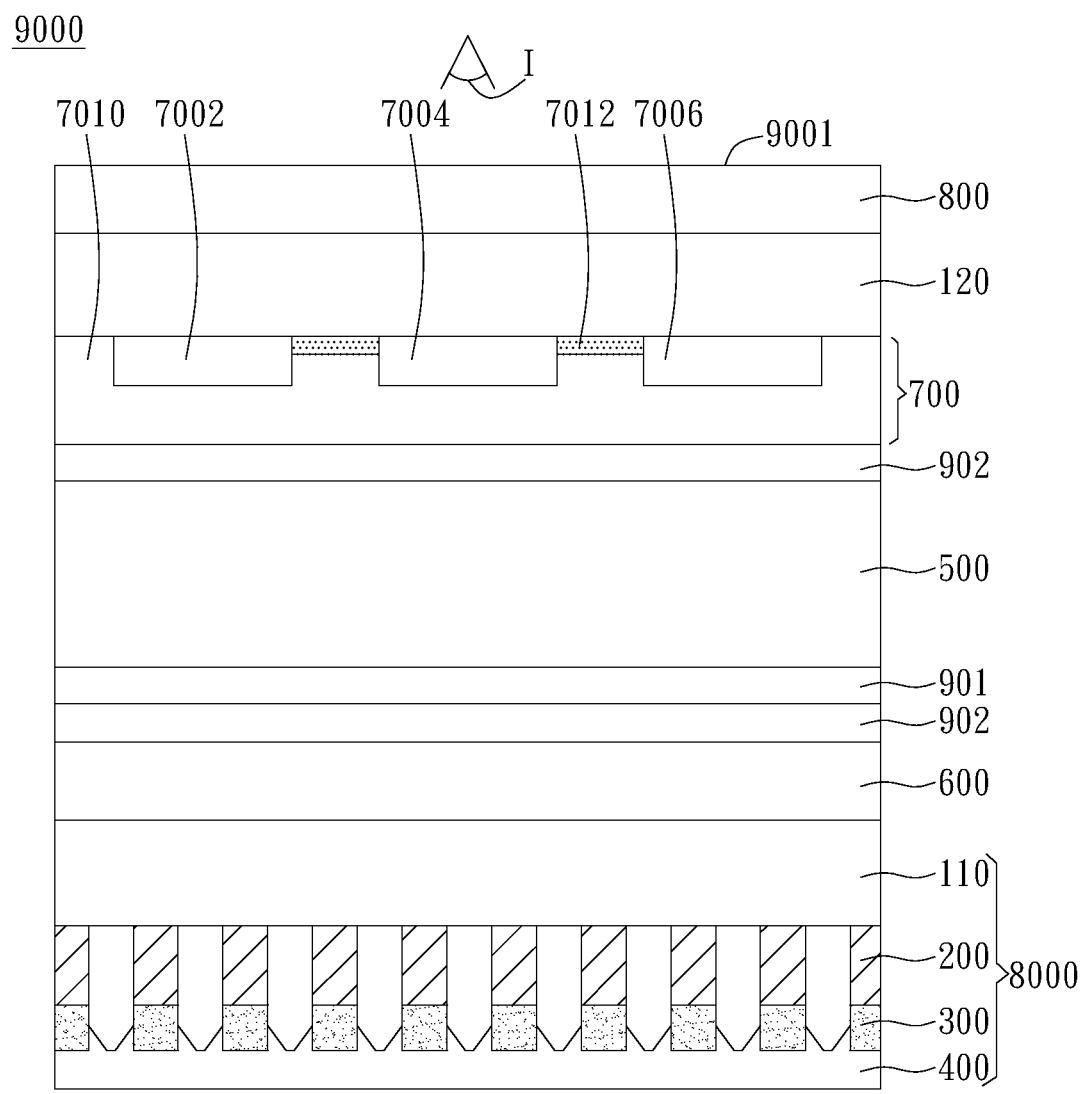

As shown in the embodiment in FIG. 7, the wire grid polarizer 8000 is disposed on the outer surface of the substrate 110. With respect to the polarizing film made by plastic film, the wire grid polarizer 8000 of the present disclosure has less thickness, lower cost, and is suitable for various laminated structures.

With respect to the embodiments in FIGS. 4-7, the location of the wire grid polarizers 8000 in the embodiments in FIG. 8-10 are closer to human eyes I. The difference between the embodiments in FIGS. 8 and 9 is the location of the wave length converting layer 700 disposed on the upper substrate (such as the substrate 110). For example, the wave length converting layer 700 is optionally disposed between the wire grids 200 and the substrate 110 (e.g. FIG. 8) or is disposed between the surface covering layer 400 and the display medium 500 (e.g. FIG. 9), and one can refer to the above description for other parts of the embodiments. When the wave length converting layer 700 includes a quantum dot layer, the wire grid polarizer 8000 is preferably disposed between the wave length converting layer 700 and the display medium 500, so as to effectively improve the depolarization of the wave length converting layer 700.

In the example embodiment shown in FIG. 10, it differs from those in FIGS. 8 and 9 by that the surface covering layer 400 is disposed on the upper substrate (such as the substrate 110), and one can refer to the above description for other parts of the embodiments.

In the example embodiments shown in FIGS. 4-10, the display panel further includes a polarizing film 800 disposed on the other side of the display medium 500 with respect to the wire grid polarizer 8000. In different embodiments, however, the polarizing film could be replaced by another wire grid polarizer, i.e. wire grid polarizers are disposed on both sides of the display pane 9000. More particularly, as shown in the embodiment in FIG. 11, the display panel 9000 further includes a plurality of another wire grids, a plurality of another patterned light absorbing layers, and another surface covering layer. The plurality of another wire grids 201 are disposed on another substrate 120, wherein there are a plurality of gaps 224 between every two of another wire grids 201. For example, the gaps 224 are between the two adjacent wire grids 201. The plurality of another patterned light absorbing layers 301 are disposed corresponding to and overlapping another wire grids 201 respectively. Another surface covering layer 401 is disposed on another patterned light absorbing layer 301. Another substrate 120, another wire grids 201, another patterned light absorbing layer 301, and another surface covering layer 401 form another wire grid polarizer 8002.

In different embodiments, with reference to FIGS. 4, 5, 7, 9, 8, and 10, the positions of the pixel layer 600 and the wave length converting layer 700 could be modified depending on the requirement. For example, except where it is disposed between the wire grid polarizer 8000 and the display medium 500, the pixel layer 600 could be disposed on the other side of the wire grid polarizer 8000 with respect to the display medium 500, or could be disposed between the substrate 110 and the wire grids 200 of the wire grid polarizer 8000. Except where it is disposed between the wire grid polarizer 8000 and the display medium 500, the wave length converting layer 700 could be disposed on the other side of the wire grid polarizer 8000 with respect to the display medium 500, or could be disposed between the substrate 120 and the wire grids 201 of the wire grid polarizer 8002.

Accordingly, take as an example where the wave length converting layer 700 is disposed on the inner surface of the substrate closer to the human eyes I (see FIGS. 4, 5, 7, 9, 8, and 10), there are three situations where the wire grid polarizer 8000 is disposed on the substrate closer to the human eyes I (see FIGS. 4, 5, and 7), and three situations where the wire grid polarizer 8000 is disposed on the substrate away from the human eyes I (see FIGS. 9, 8, and 10). Therefore, in the situations where the wire grid polarizers are disposed on both substrates 110 and 120 of the display panel 9000, there are nine display panel structures. Two of those display panel structures are described herein. However, the scope of the present disclosure is not limited by these examples.

Figure 11:
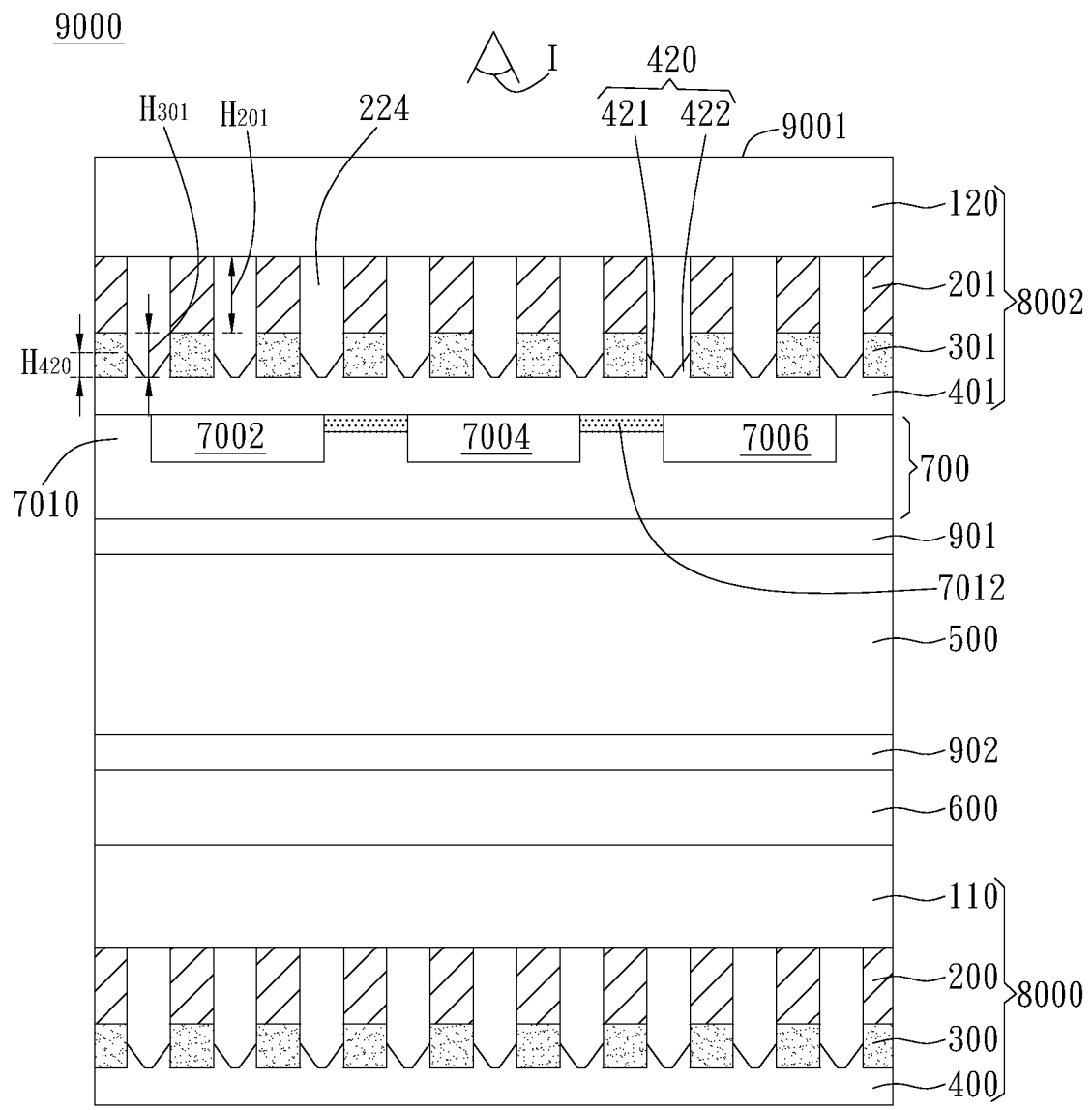
FIGS. 11 and 12 illustrate embodiments of the wire grid polarizer of the present disclosure disposed between an upper substrate and a lower substrate of a display panel.

As shown in the embodiment in FIG. 11, the surface of another surface covering layer 401 includes a plurality of another protrusions 420 extending toward another wire grids 201. At least one of the another protrusions 420 directly contacts the side wall of at least one of the another patterned light absorbing layer 301. For example, the plurality of another protrusions directly contact the side wall of the corresponding another patterned light absorbing layer 301 without filling the gaps 224 to the full. Another protrusions 420 include a third wall body 421 and a fourth wall body 422 connecting with the side walls of adjacent two of another patterned light absorbing layer 301 respectively. The heights $H_{420}$ of another protrusions 420 are less than the height $H_{301}$ of another patterned light absorbing layer 301. Thus, it keeps another surface covering layer 401 from directly contacting another wire grids 201 to reduce the extent of the lowering of extinction ratio.

Figure 12:
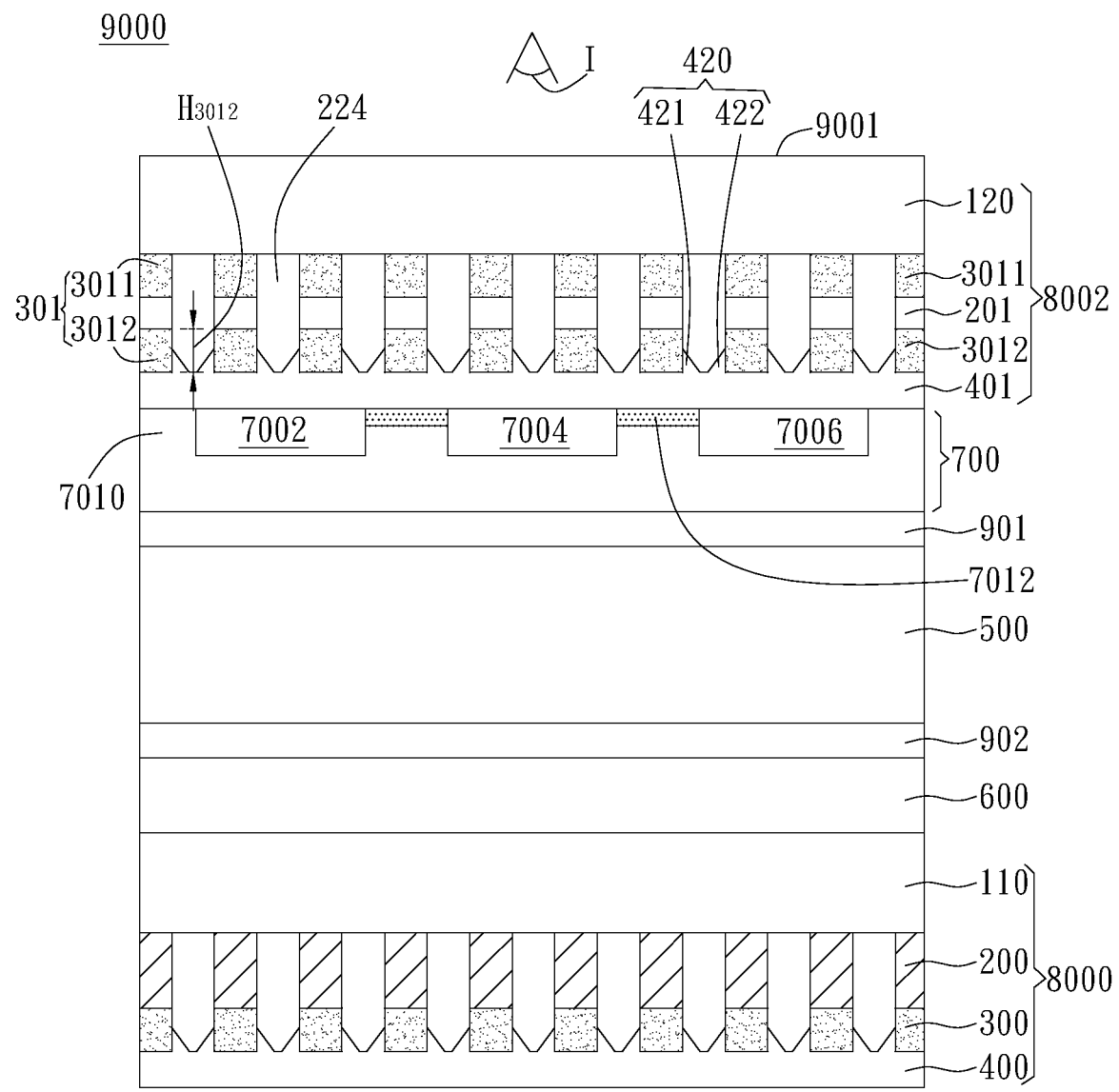

On the other hand, as shown in the embodiment in FIG. 12, considering the effect of the reflecting of the external light, every two of another patterned light absorbing layers 301 have one of the gaps 224, wherein another patterned light absorbing layer 301 includes a first layer 3011 and a second layer 3012. The first layer 3011 is disposed between another substrate 120 and another wire grids 201. The second layer 3012 is disposed between another wire grids 201 and another surface covering layer 401, wherein another surface covering layer 401 directly contacts the second layer 3012. The first layer 3011 can absorb the light reflection of the external light, hence it can reduce the light reflection of the external light on another wire grids 201 and increase the contrast of the display image. At least one of another protrusions 420 directly contacts the side wall of the second layer 3012 of another patterned light absorbing layers 301. For example, the plurality of another protrusions 420 directly contacts the side wall of the corresponding second layer 3012 of another patterned light absorbing layer 301 without filling the gaps 224 to the full. The third wall body 421 and the fourth wall body 422 connect with the side walls of adjacent two second layers 3012 respectively. The heights of another protrusions 420 are less than the height of the second layer. In different embodiments, the location of the pixel layer 600 could be modified depending on the requirement. As shown in the embodiment in FIG. 12, for example, the pixel layer 600 is disposed on one side of the wire grid polarizer 8000 close to the display medium 500.

Although the preferred embodiments of the present disclosure have been described herein, the above description is merely illustrative. Further modification of the disclosure herein disclosed will occur to those skilled in the respective arts and all such modifications are deemed to be within the scope of the disclosure as defined by the appended claims.

What is claimed is:

1. A wire grid polarizer, comprising: a substrate; a plurality of wire grids disposed on the substrate, wherein there are a plurality of gaps between every adjacent two wire grids; a plurality of patterned light absorbing layers disposed corresponding to and overlapping the wire grids respectively, wherein every adjacent two of the patterned light absorbing layers have one of the gaps, wherein the patterned light absorbing layers are closer to an external light incidence direction than the wire grids; and a surface covering layer disposed on the patterned light absorbing layers, directly contacting the patterned light absorbing layers, and covering the gaps, wherein the surface of the surface covering layer includes a plurality of protrusions extending toward the wire grids, and at least one of the protrusions directly contacts the side wall of one of the patterned light absorbing layers partially filling the gaps.

2. The wire grid polarizer of claim 1, wherein the heights of the wire grids are greater than the heights of the patterned light absorbing layers.

3. The wire grid polarizer of claim 1, wherein the protrusions include a first wall body and a second wall body connecting with the side walls of adjacent two of the patterned absorbing layers respectively.

4. The wire grid polarizer of claim 1, wherein the heights of the protrusions are less than the heights of the patterned light absorbing layers.

5. The wire grid polarizer of claim 1, wherein
the material of the wire grids is selected from metal or alloy; and
the material of the surface covering layer is selected from transparent conducting materials, silicon oxide, nitric oxide, or silicon oxynitride.

6. A display panel, comprising: the wire grid polarizer of claim 1; an another substrate disposed on the substrate of the wire grid polarizer; a display medium disposed between the substrate and the another substrate; and a pixel layer disposed on either the substrate or the another substrate, wherein the pixel layer includes a plurality of sub-pixels, wherein each of the sub-pixels includes at least one pixel electrode electronically coupled to a corresponding switching unit.

7. The display panel of claim 6, further comprising: a wave length converting layer disposed on either the substrate or the another substrate.

8. The display panel of claim 6, wherein the pixel layer and the wire grid polarizer overlap each other on the substrate.

9. The display panel of claim 6, wherein the pixel layer is disposed on the another substrate.

10. The display panel of claim 6, further comprising:
a plurality of another wire grids disposed on the another substrate, wherein there are a plurality of another gaps between every adjacent two of the another wire grids;
a plurality of another patterned light absorbing layers disposed corresponding to and overlapping the another wire grids respectively, wherein every two adjacent of the another patterned light absorbing layers have one of the another gaps, wherein the another patterned light absorbing layers have a first layer and a second layer, wherein the first layer is disposed between the another substrate and the another wire grids; and
an another surface covering layer disposed on the another patterned light absorbing layer, wherein the second layer is disposed between another wire grids and the another surface covering layer, wherein the another surface covering layer directly contacts the second layer, wherein the another substrate, another wire grids, the another patterned light absorbing layer and the another surface covering layer form the another wire grid polarizer.

11. The display panel of claim 10, wherein the surface of the another surface covering layer includes a plurality of another protrusions extending toward the another wire grids, wherein at least one of the another protrusions directly contacts the side wall of the second layer without filling the another gaps to the full.

12. The display panel of claim 11, wherein the heights of the another protrusions are less than the height of the second layer.

13. The display panel of claim 10, wherein the another protrusions include a third wall body and a fourth wall body connecting respectively with the side walls of adjacent two second layers.

* * * * *